(12) United States Patent
Hu et al.

(10) Patent No.: US 11,998,412 B2
(45) Date of Patent: Jun. 4, 2024

(54) BRUSH HEAD ASSEMBLY AND ELECTRIC TOOTHBRUSH

(71) Applicant: Feifan Hu, Guangdong (CN)

(72) Inventors: Feifan Hu, Guangdong (CN); Jiankun Hu, Guangdong (CN)

(73) Assignee: Feifan Hu, Shenzhen (CN)

( * ) Notice: Subject to any disclaimer, the term of this patent is extended or adjusted under 35 U.S.C. 154(b) by 476 days.

(21) Appl. No.: 17/432,090

(22) PCT Filed: Jun. 19, 2019

(86) PCT No.: PCT/CN2019/091909
§ 371 (c)(1),
(2) Date: Aug. 19, 2021

(87) PCT Pub. No.: WO2020/181674
PCT Pub. Date: Sep. 17, 2020

(65) Prior Publication Data
US 2022/0168082 A1  Jun. 2, 2022

(30) Foreign Application Priority Data
Mar. 14, 2019 (CN) .......................... 201910194301.5

(51) Int. Cl.
| A61C 17/22 | (2006.01) |
| A46B 5/00 | (2006.01) |
| A46B 9/04 | (2006.01) |
| A46B 13/02 | (2006.01) |

(52) U.S. Cl.
CPC .......... *A61C 17/222* (2013.01); *A46B 5/0095* (2013.01); *A46B 9/04* (2013.01); *A46B 13/02* (2013.01); *A61C 17/221* (2013.01)

(58) Field of Classification Search
CPC ...... A46B 5/0095; A46B 7/042; A61C 17/222
See application file for complete search history.

(56) References Cited

U.S. PATENT DOCUMENTS

| 6,588,042 B2 * | 7/2003 | Fritsch | A61C 17/34 |
| | | | 403/313 |
| 8,782,841 B2 * | 7/2014 | Sale | A61C 17/222 |
| | | | 15/22.1 |
| 9,724,180 B1 * | 8/2017 | Liu | A61C 17/222 |
| 2005/0108838 A1 * | 5/2005 | Schaefer | A61C 17/22 |
| | | | 15/22.1 |

* cited by examiner

*Primary Examiner* — Randall E Chin

(57) ABSTRACT

Provided are a brush head assembly and an electric toothbrush. The brush head assembly comprises a brush head body, a linking component and a locking cylinder; wherein a component assembly cavity is arranged at the tail end of the brush head body, the linking component is installed in the component assembly cavity, and a deformable locking cylinder including a fulcrum force-receiving part and a force applying part with elastic forces at both ends is embedded; the locking cylinder makes most of the strokes of the drive shaft in the insertion process smooth and convenient, only until the two force applying parts are both in contact with the drive shaft, will force be generated to lock the drive shaft, and the locking effect achieved by this elastic force can be maintained for a long time. Thus ensuring the capabilities of torque transmission and axial retention.

17 Claims, 10 Drawing Sheets

BRUSH HEAD ASSEMBLY AND ELECTRIC TOOTHBRUSH

TECHNICAL FIELD

The disclosure relates to the field of electric toothbrushes, in particular to the field that a brush head assembly is locked with a drive shaft to complete the functions of torque transmission and axial retention of the drive shaft.

BACKGROUND

As is known to all, an electric toothbrush includes a handle assembly and a brush head assembly. The handle assembly includes a housing, and a battery, a motor and a control panel arranged in the housing; a drive shaft is sealedly extended from the front end of the housing, and the drive shaft is detachably connected with the brush head assembly. When using the electric toothbrush, the drive shaft of the handle assembly swings back and forth along the axis at high frequency, which drives the brush head assembly inserted at it to swing back and forth, thereby the bristles on the brush head assembly swing to brush teeth. This requires sufficient locking force on the shaft to transmit torque, and also requires convenient removal of the brush head for cleaning or replacement.

When brush head assembly swings back and forth along the axis at high frequency, especially when the swing torque and swing amplitude are relatively large, if the locking force on the axis is not large enough, the torque transmission would be problematic, and the toothbrush assembly would fall off from the drive shaft when in use.

The existing technique to provide locking force on the shaft is to install a linking component and a c-shaped spring in the brush head assembly, and the c-shaped spring wraps the outer of the linking component, a shaft core into which a drive shaft is inserted is formed inside the linking component; the c-shaped spring applies enough force on the main part of the linking component, so that the physical contact between the linking component and one or more contact areas of the drive shaft in the linking component has enough force to lock the brush head.

However, this connection technique has some defects. There is a long stroke for force receiving process when the drive shaft is inserted or extracted, which makes insertion and extraction difficult, and repeated insertion and extraction may easily lead to insufficient locking force on the drive shaft, which affects torque transmission and causes brush head assembly to fall off.

SUMMARY

The disclosure provides a brush head assembly and an electric toothbrush, aiming at overcoming the defects in the existing connection technique, that is, there is a long stroke for force receiving process when the drive shaft is inserted or extracted, which makes insertion and extraction difficult, and repeated insertion and extraction may easily lead to insufficient locking force on the drive shaft, which affects torque transmission and causes brush head assembly to fall off.

One aspect of the disclosure provides a brush head assembly, including a brush head body, a linking component and a locking cylinder;
the front end of the brush head body is provided with bristles, and the rear end is provided with a component assembly cavity;
the locking cylinder is a deformable elastic piece, including a fulcrum force-receiving part at the middle part and a force applying part at both ends for applying elastic force; a connecting line between the two force applying parts and the fulcrum force-receiving part is V-shaped;
the linking component includes a base and a component main body, a shaft center hole is arranged at the shaft center of the base and the component main body, and the shaft center hole is used for insertion of a drive shaft;
the component main body is installed in the component assembly cavity, and a lock cylinder assembly cavity is formed between the component main body and an inner wall of the component assembly cavity, wherein the lock cylinder assembly cavity is communicated with the shaft center hole; and
the locking cylinder is embedded in the lock cylinder assembly cavity, so that when the drive shaft is inserted into the shaft center hole, the locking cylinder is elastically deformed to generate elastic force to lock the drive shaft through the two force applying parts.

In the brush head assembly of the present disclosure, a component assembly cavity is arranged at the tail end of the brush head body, a linking component is installed in the component assembly cavity, and a deformable locking cylinder including a fulcrum force-receiving part and a force applying part with elastic forces at both ends is embedded. The locking cylinder enables that when that drive shaft is insert into the shaft center hole of the brush head assembly, the head of the drive shaft passes through the first force applying part of the two force applying parts of the locking cylinder without touching the second force applying part, the drive shaft would not be stressed. Until the drive shaft contacts the second force applying part, the drive shaft starts to receive the elastic force exerted by the two force applying parts under the lever action of the locking cylinder, thus making the insertion and extraction process more convenient and smooth. Only when the insertion is fully completed, will the elastic force generated by the elastic deformation of the locking cylinder act on the drive shaft through the two force applying parts, so as to lock the drive shaft. The above-described locking cylinder makes most of the strokes of the insertion process of the drive shaft smooth and convenient, only when the two force applying parts are both in contact with the drive shaft, will the force is generated to lock the drive shaft, and the locking effect obtained by the elastic force can be maintained for a long time. Thus ensuring the capabilities of torque transmission and axial retention.

Further, the component assembly cavity sequentially includes a front limit hole, a main assembly cavity and a component locking cavity from front to rear;
a guide column is arranged at the front end of the component main body of the linking component, and a snap-fit part is arranged at the rear end, the snap-fit part is connected with the base; the guide column is inserted into the front limit hole; the component main body is assembled in the main assembly cavity; the snap-fit part is locked in the component locking cavity;
a front limit table is arranged at the connection between the front end of the component main body and the guide column, and a snap protrusion is arranged at the connection between the rear end of the component main body and the snap-fit part; the lock cylinder assembly cavity is formed between the front limit table and the snap protrusion, and in the inner wall of the component assembly cavity; and the inner wall of the component assembly cavity corresponding to the lock cylinder assembly cavity is a lock cylinder force-bearing part, the lock cylinder force-bearing part abuts against the fulcrum force-receiving part when the locking cylinder is stressed, so that the locking cylinder is elastically deformed.

The assembly structure of the linking component and locking cylinder makes it convenient and quick to assemble the locking cylinder and linking component into the component assembly cavity of the brush head assembly.

Further, a rear limit member is installed at the rear of the component locking cavity, and the snap protrusion is clamped into the component locking cavity in front of the rear limit member, so as to install the component main body in the component assembly cavity. This way is easier for manufacture and installation.

Further, a limit shaft is arranged at the fulcrum force-receiving part at the middle part of the locking cylinder, the limit shaft limits the locking cylinder in the lock cylinder assembly cavity without falling into the shaft center hole.

Further, the component main body is provided with a shaft seat between the front limit table and the snap protrusion; the limit shaft is installed in the shaft seat.

Further, a filler is installed in the tail of the base. The filler can guide the drive shaft to be inserted and adjust the moment of inertia of the brush head assembly.

Further, the brush head assembly includes a plurality of locking cylinders; the lock cylinder assembly cavity is formed between the component main body and the inner wall of the component assembly cavity, and the number of the lock cylinder assembly cavities corresponds to that of the locking cylinders, the lock cylinder assembly cavity is communicated with the shaft center hole; and each locking cylinder is correspondingly assembled into each lock cylinder assembly cavity.

Further, the locking cylinder is formed by bending an elastic metal sheet, the force applying parts at both ends form an inward folded structure by bending both ends of the elastic metal sheet; the two sides of the fulcrum force-receiving part at the middle part form an annular limit ring; the limit ring enables the locking cylinder to be embedded in the lock cylinder assembly cavity.

Another aspect of the disclosure provides an electric toothbrush, including a brush head assembly and a handle assembly, wherein the handle assembly includes a housing, and a motor, a control panel and a battery arranged in the housing; a drive shaft of the motor extends out of the housing; and the brush head assembly can be inserted at the drive shaft.

In the electric toothbrush of the present disclosure, a component assembly cavity is arranged at the tail end of the brush head body, a linking component is installed in the component assembly cavity, and a deformable locking cylinder including a fulcrum force-receiving part and a force applying part with elastic forces at both ends is embedded. The locking cylinder enables that when that drive shaft is insert into the shaft center hole of the brush head assembly, the head of the drive shaft passes through the first force applying part of the two force applying parts of the locking cylinder without touching the second force applying part, the drive shaft would not be stressed. Until the drive shaft contacts the second force applying part, the drive shaft starts to receive the elastic force exerted by the two force applying parts under the lever action of the locking cylinder, thus making the insertion and extraction process more convenient and smooth. Only when the insertion is fully completed, will the elastic force generated by the elastic deformation of the locking cylinder act on the drive shaft through the two force applying parts, so as to lock the drive shaft. The above-described locking cylinder makes most of the strokes of the insertion process of the drive shaft smooth and convenient, only when the two force applying parts are both in contact with the drive shaft, will the force is generated to lock the drive shaft, and the locking effect obtained by the elastic force can be maintained for a long time. Thus ensuring the capabilities of torque transmission and axial retention.

Further, the drive shaft is provided with a lock cylinder mating face matched with the locking cylinder; the lock cylinder mating face is provided with one or two grooves matched with the force applying part of the locking cylinder. The groove can make the locking effect more reliable when it is in the locking position. Meanwhile, it will make the elastic deformation of the locking cylinder partially rebound, so that the elasticity can be more easily maintained for a long time.

Figure 1:
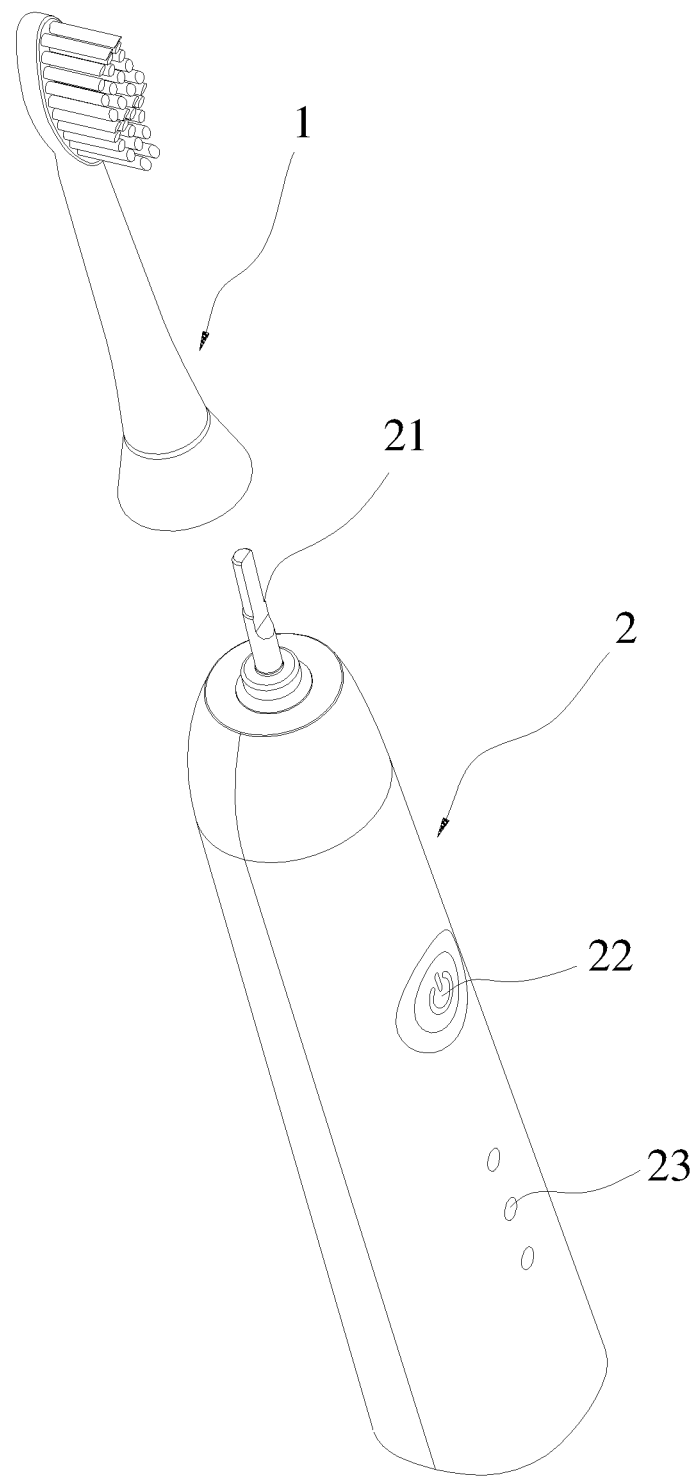
FIG. 1 is a schematic perspective view of an electric toothbrush provided by an embodiment of the present disclosure.

Reference numerals in the figures are as follows:
1. Brush head assembly; 2. Handle assembly;
11. Brush head body; 111. Bristles; 112. Component assembly cavity; 1121. Main assembly cavity; 1122. Component locking cavity; 1123. Front limit hole; 1124. Lock cylinder assembly cavity; 1125. Rear limit member; 1126. Lock cylinder force-bearing part;
12. Locking cylinder; 121. Force applying part; 122. Limit shaft; 123. Limit ring; 121a. First force applying part; 121b. Second force applying part; 1211. Arc surface; 124. fulcrum force-receiving part;
13. Linking component; 130. Shaft center hole; 131. Component main body; 132. Snap-fit part; 133. Guide column; 134. Base; 1311. Front limit table; 1312. Shaft seat; 1321. Snap protrusion; 1301. Force-bearing part at drive shaft lower end;
14. Filler;
21. Drive shaft; 211. Lock cylinder mating face; 212. Component mating face; 2111. Groove;
22. Power switch;
23. Indicator light.

DETAILED DESCRIPTION

In order to make the technical problems, technical solutions and beneficial effects of the disclosure clearer, the present disclosure will be further described in detail with reference to the drawings and embodiments. It should be understood that the specific embodiments described here are only used to illustrate the present disclosure, and not intended to limit the disclosure.

In the description of the present disclosure, it should be understood that the terms "longitudinal", "radial", "length", "width", "thickness", "upper", "lower", "front", "rear", "left", "right", "vertical", "horizontal", "top", "bottom", "inner", "outer" and the like indicate an orientation or positional relationship based on the orientation or positional relationship shown in the drawings, for convenience and simplicity of the description only, and are not intended to indicate or imply that the device or component of the present disclosure must have a particular orientation, or be constructed or operated in a particular orientation, and is therefore not to be interpreted as limiting the scope of the disclosure. In the description of the present disclosure, unless otherwise specified, "plurality" means two or more. The singular terms "a", "an" and "the" include plural reference and vice versa unless the context clearly indicates otherwise.

In the description of the present disclosure, it should be noted that the terms "installed", "connected to" and "connected with" should be understood in a broad sense, for example, it may be fixed connection, detachable connection or integrated connection. It may be connected mechanically or electrically. It may be directly connected or indirectly connected through an intermediate element, or communicated inside two elements. For those skilled in the art, the specific meanings of the above terms in the present disclosure may be understood in specific situations.

Embodiments

As shown in FIG. 1, an electric toothbrush is disclosed in this embodiment, which includes a handle assembly 2 and a brush head assembly 1. In this embodiment, the handle assembly 2 adopts known technology, including a housing, and a motor, a control panel and a battery arranged in the housing; a drive shaft 21 of the motor extends from the housing. The brush head assembly 1 can be inserted at the drive shaft 21. Generally, the housing is also provided with a power switch 22, an indicator light 23, etc., which are not the improved parts in this embodiment, so they will not be described again.

In this embodiment, the core concept is to improve the brush head assembly 1, so that it can be better locked with the drive shaft 21. The brush head assembly 1 disclosed in the present application will be further explained with reference to the attached drawings.

Figure 2:
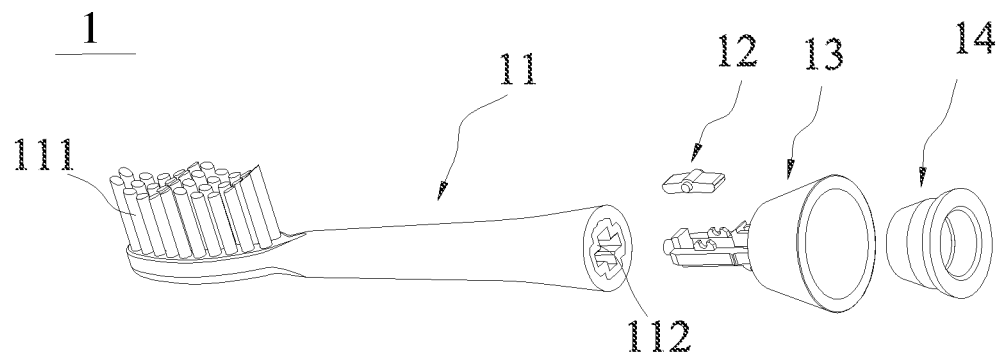
FIG. 2 is an exploded perspective view of a brush head assembly provided by an embodiment of the present disclosure.
Figure 3:
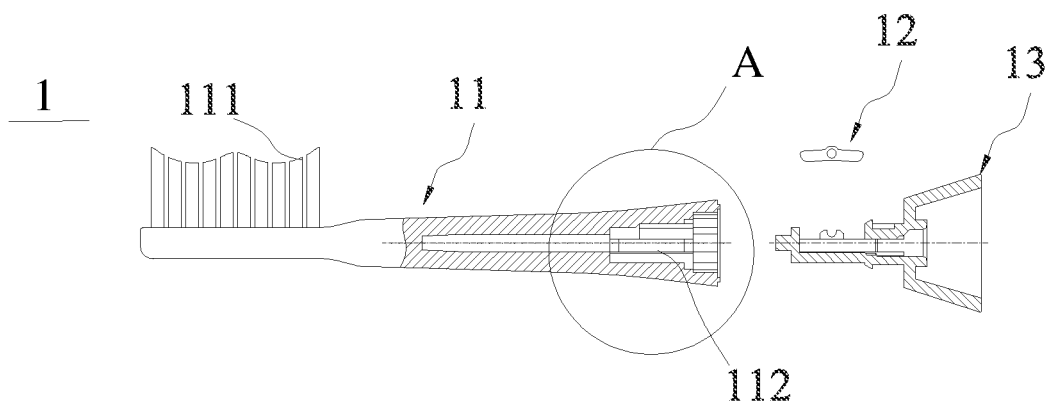
FIG. 3 is an exploded sectional view of a brush head assembly provided by an embodiment of the present disclosure.

As shown in FIGS. 2 and 3, the brush head assembly 1 disclosed in this embodiment includes a brush head body 11, a linking component 13 and a locking cylinder 12. The front end of the brush head body 11 is provided with bristles 111, and the rear end is provided with a component assembly cavity 112. The front end and rear end here are relative position, and the structure such as bristles 111 on brush head body 11 is known to the public, so it will not be explained in detail. In this embodiment, the core lies in the connection structure formed by the component assembly cavity 112 at the rear end, the linking component 13 and locking cylinder 12. The brush head body 11 is usually made of plastic material and integrally-formed.

Figure 4:
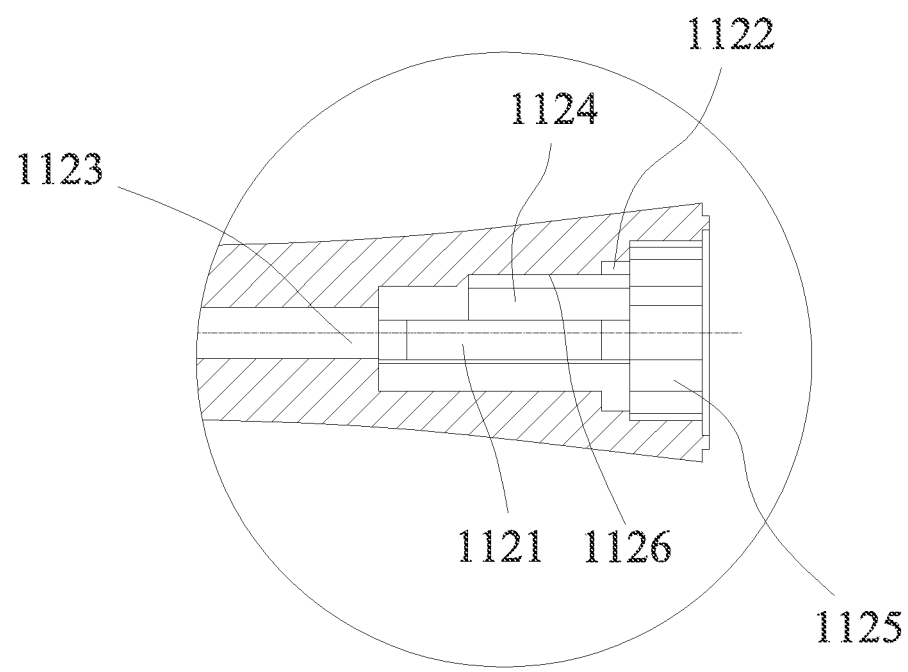
FIG. 4 is an enlarged schematic view of A shown in FIG. 3.
Figure 5:
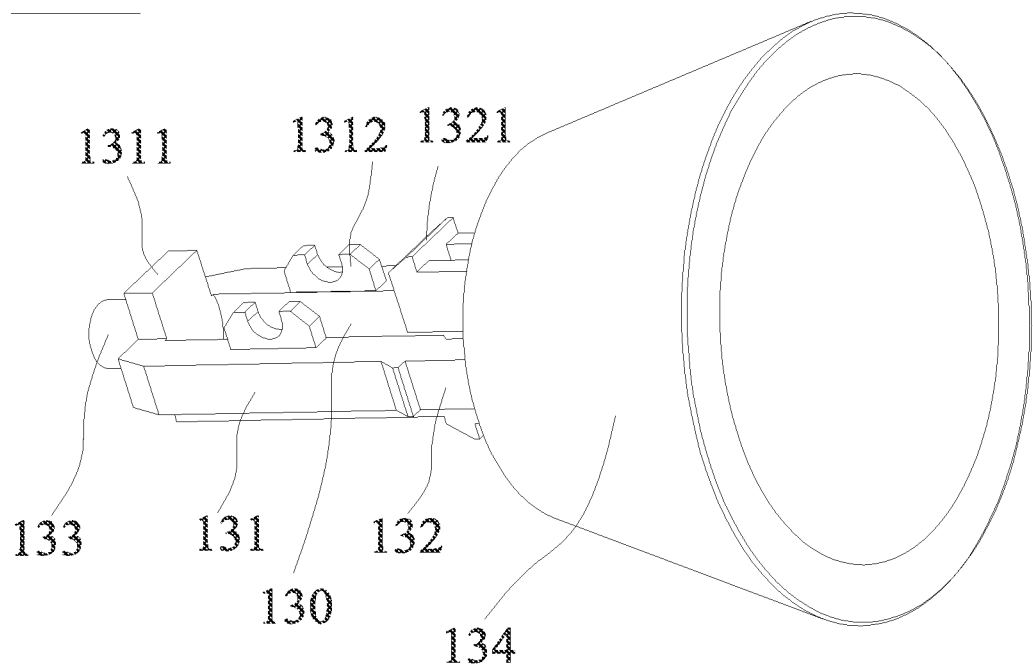
FIG. 5 is a schematic perspective view of a linking component provided by an embodiment of the present disclosure.
Figure 6:
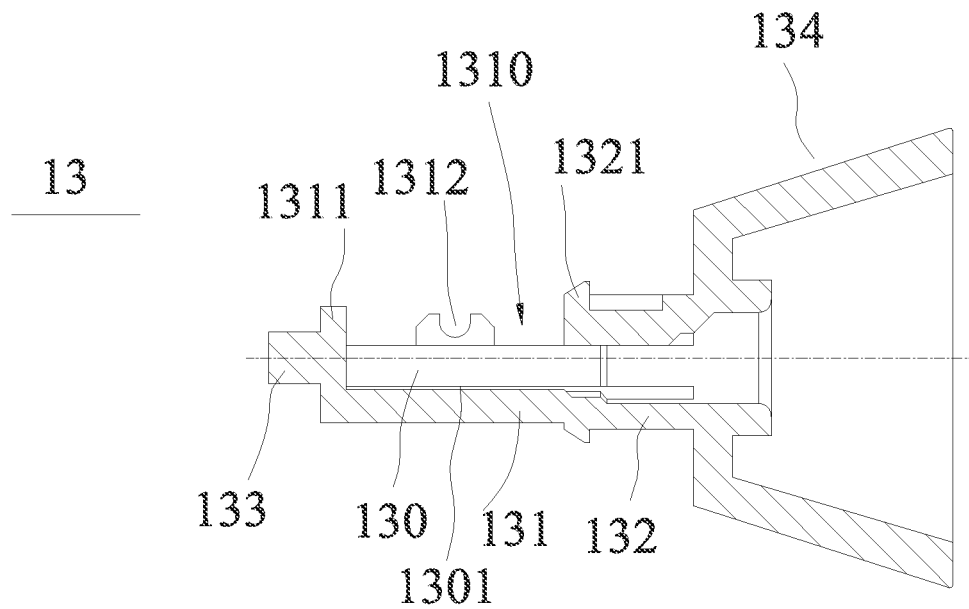
FIG. 6 is a sectional view of a linking component provided by an embodiment of the present disclosure.

As shown in FIGS. 4, 5 and 6, the linking component 13 includes a base 134 and a component main body 131, a shaft center hole 130 is arranged at the shaft center of the base 134 and the component main body 131, and the shaft center hole 130 is used for insertion of a drive shaft 21. The shape of the shaft center hole 130 is matched with that of the drive shaft 21, and it is usually an asymmetric insertion hole. Therefore, when the drive shaft 21 is inserted into the shaft center hole 130, reverse rotation can be prevented, and the drive shaft 21 cannot rotate freely in the shaft center hole 130, so that the drive shaft 21 and the linking component 13 are relatively stationary. Thus, the swing torque and vibration output by the drive shaft 21 can be transmitted to the brush head body 11, and further to the bristles 111 on the brush head body 11. The component main body 131 is installed in the component assembly cavity 112, and a lock cylinder assembly cavity 1124 is formed between the component main body 131 and an inner wall of the component assembly cavity 112, wherein the lock cylinder assembly cavity 1124 is communicated with the shaft center hole 130. The lock cylinder assembly cavity 1124 is used to limit the locking cylinder 12, and its specific shape and position are not particularly defined as long as the locking cylinder 12 does not fall into the shaft center hole 130, and the two force applying parts 121 of the locking cylinder 12 can enter the shaft center hole 130 (see the drawings for reference signs) to press and lock the drive shaft 21.

As shown in FIG. 5 and FIG. 6, the base 134 is designed as a trumpet-shaped structure, and its diameter is gradually enlarged from the component main body 131. The trumpet-shaped structure enables that after the component main body 131 is installed at the end of the brush head body 11, it is in a closed butt joint with the end of the brush head body 11. As a result, after the drive shaft 21 of the handle assembly 2 is inserted from the base 134, the end of the base 134 (the left side shown in the drawing) is matched with the end of the drive shaft 21 extending out of the housing of the handle assembly 2.

Figure 7:
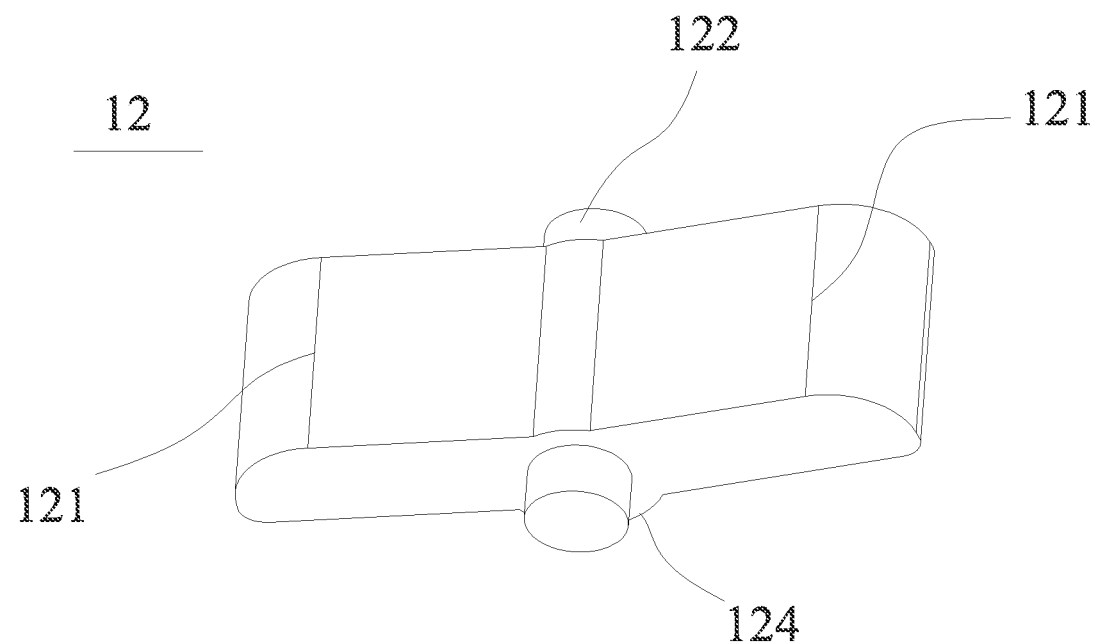
FIG. 7 is a schematic perspective view of a locking cylinder provided by an embodiment of the present disclosure.

Specifically, as shown in FIG. 7, the locking cylinder 12 is a deformable elastic piece, including a fulcrum force-receiving part 124 at the middle part and a force applying part 121 at both ends for applying elastic force; a connecting line between the two force applying parts 121 and the fulcrum force-receiving part 124 is V-shaped. In this embodiment, the locking cylinder 12 is v-shaped or u-shaped, and its material may be plastic or metal, which has certain elastic deformation ability. When the force applying part 121 is pressed, the fulcrum force-receiving part 124 abuts against the lock cylinder force-bearing part 1126, so that the locking cylinder 12 is elastically deformed, and then the elastic force generated by the elastic deformation is output through the two force applying parts 121. There are no special restrictions on the specific form or material of the locking cylinder 12. As long as it can deform and generate elastic force when being pressed, and then press the drive shaft 21.

The locking cylinder 12 is embedded in the lock cylinder assembly cavity 1124, so that when the drive shaft 21 is inserted into the shaft center hole 130, the locking cylinder 12 is elastically deformed to generate elastic force to lock the drive shaft 21 through the two force applying parts 121.

To make those skilled in the art better understand the assembly relationship, as shown in the enlarged view of FIG. 4, the component assembly cavity 112 sequentially includes a front limit hole 1123, a main assembly cavity 1121 and a component locking cavity 1122 from front to rear. The "front" is the left side shown in the drawing, and the "rear" is the right side shown in the drawing.

As shown in FIG. 5 and FIG. 6, a column-shaped guide column 133 is arranged at the front end of the component main body 131 of the linking component 13, and a snap-fit part 132 is arranged at the rear end, the snap-fit part 132 is connected with the base 134. Obviously, the guide column 133 is not necessarily to be column-shaped, it may also be a triangle, a square or polygons as long as it matches with the shape of the front limit hole 1123. The guide column 133 is inserted into the front limit hole 1123; the component main body 131 is assembled in the main assembly cavity 1121; the snap-fit part 132 is locked in the component locking cavity 1122.

In this embodiment, a front limit table 1311 is arranged at the connection between the front end of the component main body 131 and the guide column 133, and a snap protrusion 1321 is arranged at the connection between the rear end of the component main body 131 and the snap-fit part 132. The lock cylinder assembly cavity 1124 is formed between the front limit table 1311 and the snap protrusion 1321, and in the inner wall of the component assembly cavity 112. The component locking cavity 1122 has the function of clamping and locking the component main body 131 to prevent it from falling out of the component assembly cavity 112. Therefore, a slot (not shown in the drawings) matched with the snap protrusion 1321 should be provided inside it. In this embodiment, the component main body 131 is provided with snap protrusions 1321 in the up, down, left and right directions, and the snap protrusion 1321 is fixedly connected with the slot provided in the component locking cavity 1122 in a snap fitting.

The inner wall of the component assembly cavity 112 corresponding to the lock cylinder assembly cavity 1124 is a lock cylinder force-bearing part 1126, the lock cylinder force-bearing part 1126 abuts against the fulcrum force-receiving part 124 when the locking cylinder 12 is stressed, so that the locking cylinder 12 is elastically deformed.

The assembly structure of the linking component 13 and locking cylinder 12 makes it convenient and quick to assemble the locking cylinder 12 and linking component 13 into the component assembly cavity 112 of the brush head assembly 1.

In this embodiment, the brush head body 11 is an integrally formed plastic part, and because the plastic part is small in size, it is difficult to form a complex structure on the inner surface during molding. Therefore, in this embodiment, a rear limit member 1125 is installed at the rear of the component locking cavity 1122, and the snap protrusion 1321 is clamped into the component locking cavity 1122 in front of the rear limit member 1125 (that is, the slot in the component locking cavity 1122), so as to install the component main body 131 in the component assembly cavity 112. This way is easier for manufacture and installation.

Similarly, usually linking component 13 also uses plastic parts, which have certain requirements on wall thickness during molding. If the wall is too thick, the appearance will be affected by uneven plastic shrinkage. Therefore, its base 134 is set with a trumpet-shaped structure formed by gradually expanding the diameter, and filler 14 can be installed in the tail of the base 134. The filler 14 can guide the drive shaft 21 to be inserted and adjust the moment of inertia of the brush head assembly 1.

The way in which the locking cylinder 12 is limited in the lock cylinder assembly cavity 1124 is not particularly defined, there are many ways, and some examples are given in this embodiment. For example, a limit shaft 122 is arranged at the fulcrum force-receiving part 124 at the middle part of the locking cylinder 12, the limit shaft 122 limits the locking cylinder 12 in the lock cylinder assembly cavity 1124 without falling into the shaft center hole 130.

Preferably, as shown in FIG. 5 and FIG. 6, the component main body 131 is provided with a shaft seat 1312 between the front limit table 1311 and the snap protrusion 1321.

Figure 9:
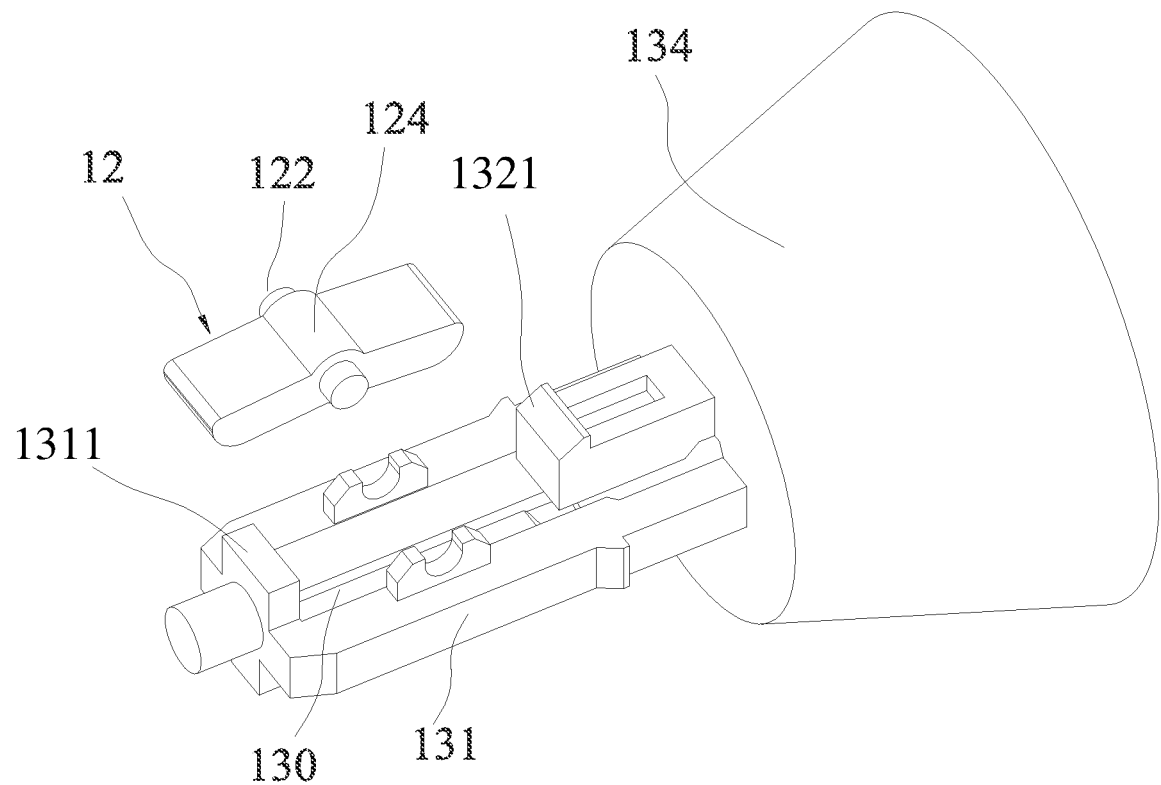
FIG. 9 is a schematic perspective view of an assembly of the locking cylinder and linking component provided by an embodiment of the present disclosure.

As shown in FIG. 5, FIG. 6 and FIG. 9, the limit shaft 122 is installed in the shaft seat 1312. In this embodiment, the shaft seat 1312 is provided with an annular groove with a clamping notch (not shown in the drawings) at its upper end, and the limit shaft 122 can be clamped in the clamping notch. There are two shaft seats 1312, left and right. The two limit shafts 122 are respectively installed in the shaft seats 1312, so that the locking cylinder 12 can rotate around the limit shaft 122 and will not be separated from the shaft seat 1312.

Figure 10:
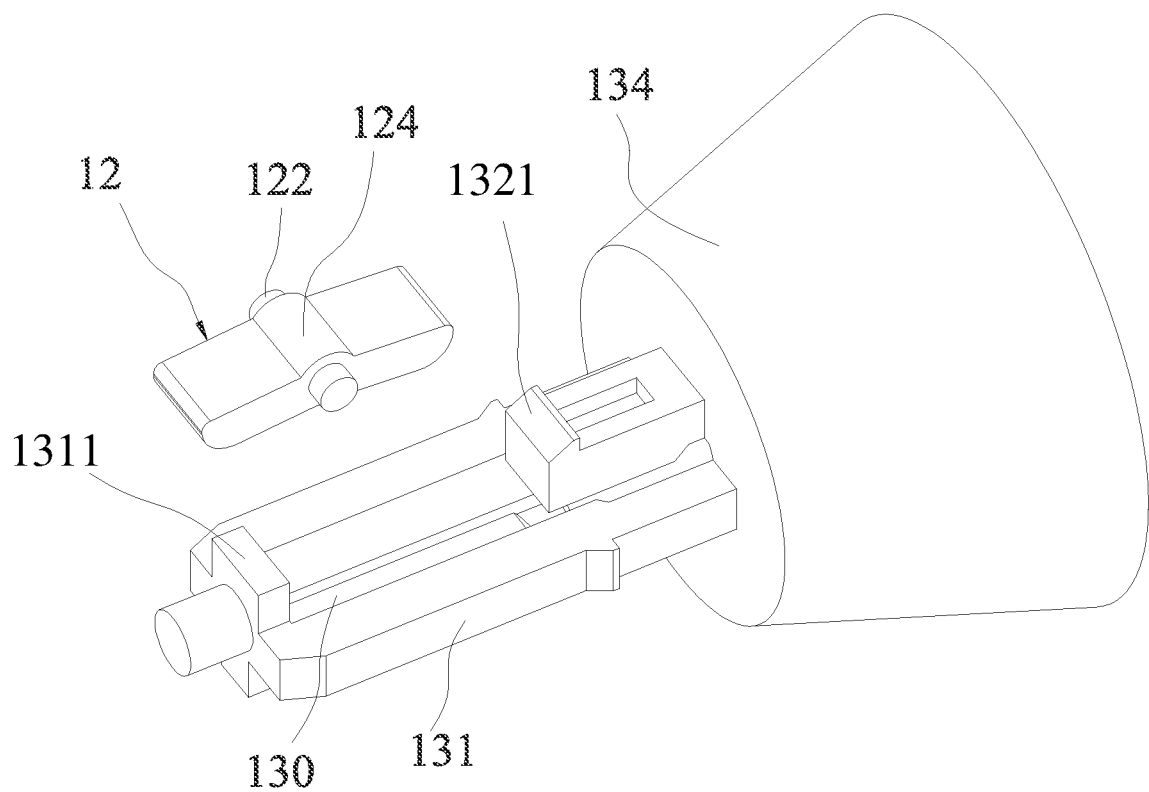
FIG. 10 is a schematic perspective view of another assembly of the locking cylinder and linking component provided by an embodiment of the present disclosure.

Obviously, the shaft seat 1312 is not a must. as shown in FIG. 10, even if there is no shaft seat 1312, the two limit shafts 122 on the locking cylinder 12 can still ensure that the locking cylinder 12 does not fall into the shaft center hole 130.

Figure 8:
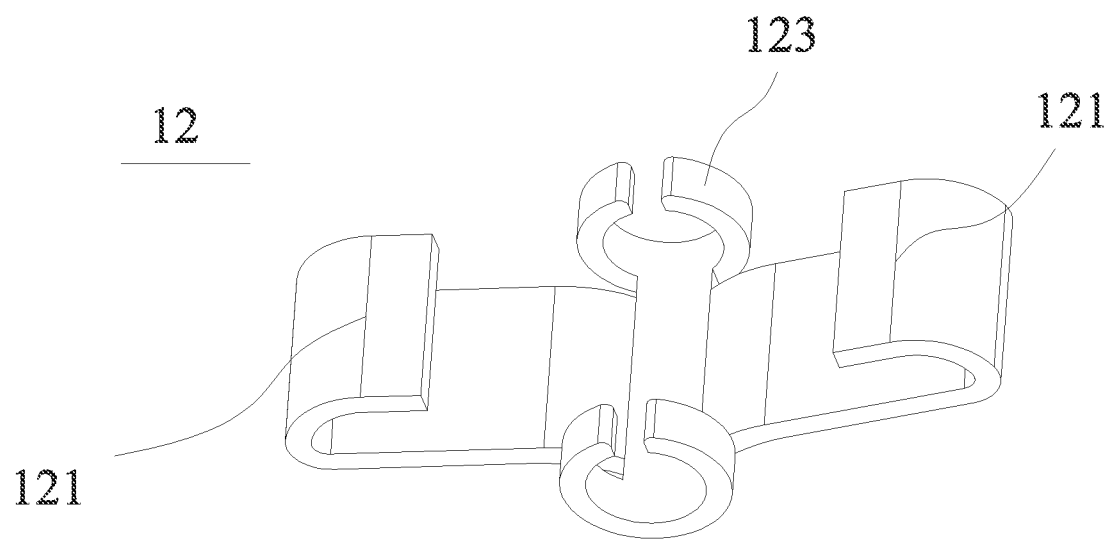
FIG. 8 is a schematic perspective view of another locking cylinder provided by an embodiment of the present disclosure.

As an embodiment, the locking cylinder 12 may be the plastic part shown in FIGS. 2, 3 and 7, and may also be made of metal materials. As shown in FIG. 8, the locking cylinder 12 is formed by bending an elastic metal sheet, the force applying parts 121 at both ends form an inward folded structure by bending both ends of the elastic metal sheet; the two sides of the fulcrum force-receiving part 124 at the middle part form an annular limit ring 123; the limit ring 123 enables the locking cylinder 12 to be embedded in the lock cylinder assembly cavity 1124, and prevents the locking cylinder 12 from falling into the shaft center hole 130 from the lock cylinder assembly cavity 1124.

As an embodiment, the drive shaft 21 in the handle assembly 2 has two mating faces, namely a component mating face 212 that matches with the force-bearing part at drive shaft lower end 1301 and a lock cylinder mating face 211 that matches with the locking cylinder 12. At least one of the component mating face 212 and lock cylinder mating face 211 is a plane to ensure the insertion direction and torque transmission.

Figure 11:
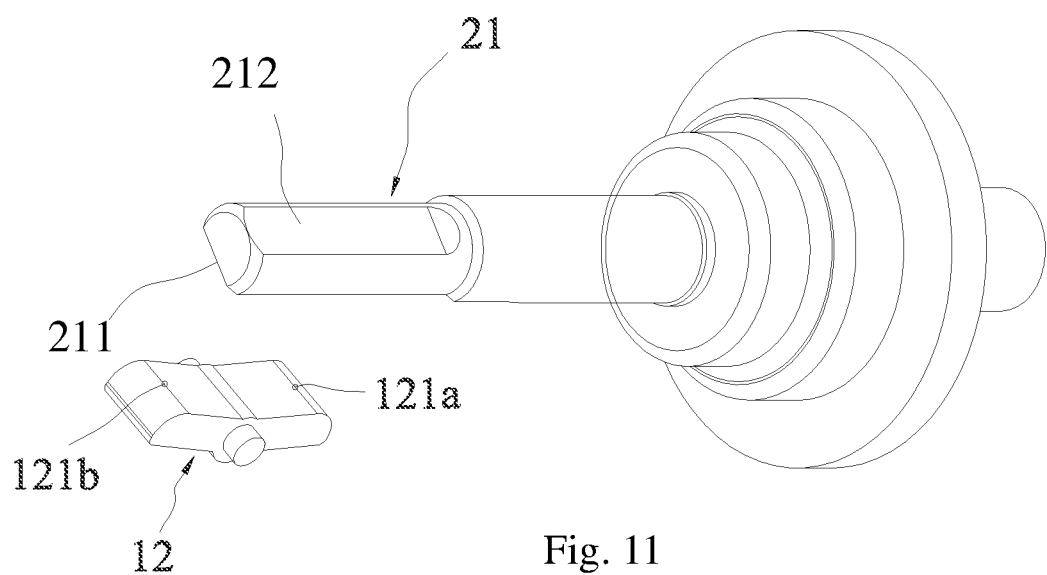
FIG. 11 is a schematic view of the cooperation between a locking cylinder and a drive shaft provided by an embodiment of the present disclosure.

Preferably, as shown in FIG. 11, the drive shaft 21 is provided with a lock cylinder mating face 211 that matches with the locking cylinder 12, and the lock cylinder mating face 211 is preferably a plane.

For the convenience of the following description, as shown in FIG. 11, in this embodiment, the force applying parts 121 on the locking cylinder 12 are further identified separately. In the direction of inserting the drive shaft 21 into the shaft center hole 130, the above-mentioned force applying parts 121 are respectively named as first force applying part 121a and second force applying part 121b. The first force applying part 121a and second force applying part 121b are not particularly defined as long as they can generate elastic force against the drive shaft 21 when being pressed by the drive shaft 21.

Figure 12:
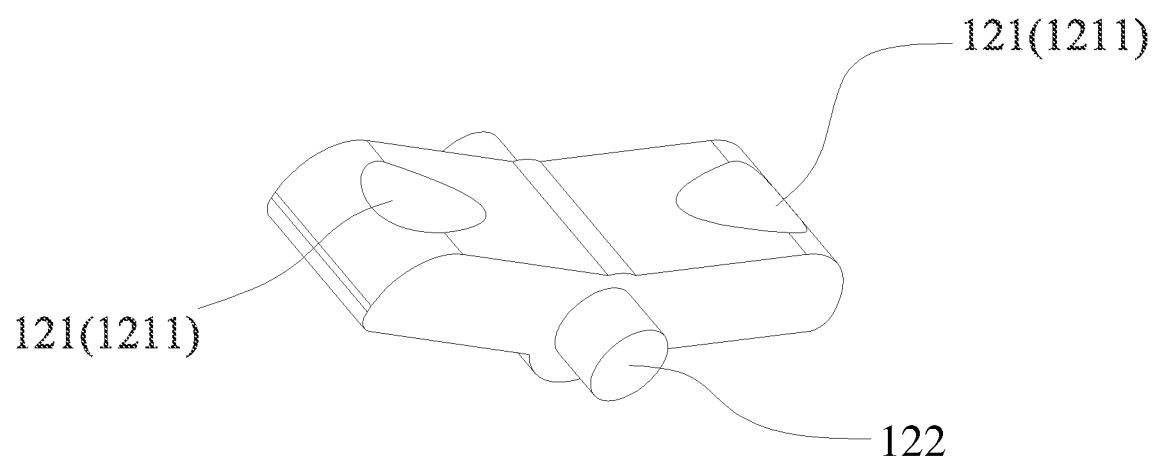
FIG. 12 is a schematic perspective view of a preferred locking cylinder further provided by an embodiment of the present disclosure.
Figure 13:
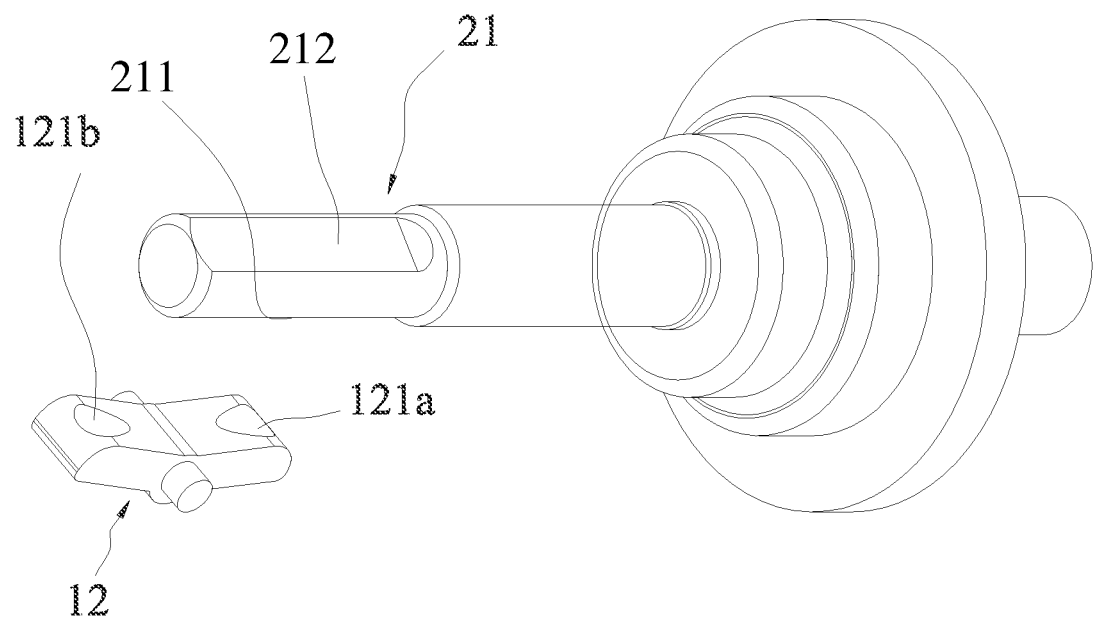
FIG. 13 is a schematic view of the cooperation between the locking cylinder shown in FIG. 12 and a drive shaft.

As another embodiment, as shown in FIG. 12 and FIG. 13, the lock cylinder mating face 211 on the drive shaft 21 which is matched with the locking cylinder 12 is a cylindrical surface. In this case, the force applying part 121 of the locking cylinder 12 is designed as an arc surface 1211 matched with the drive shaft 21. It is convenient for manufacturing the drive shaft 21.

Figure 14:
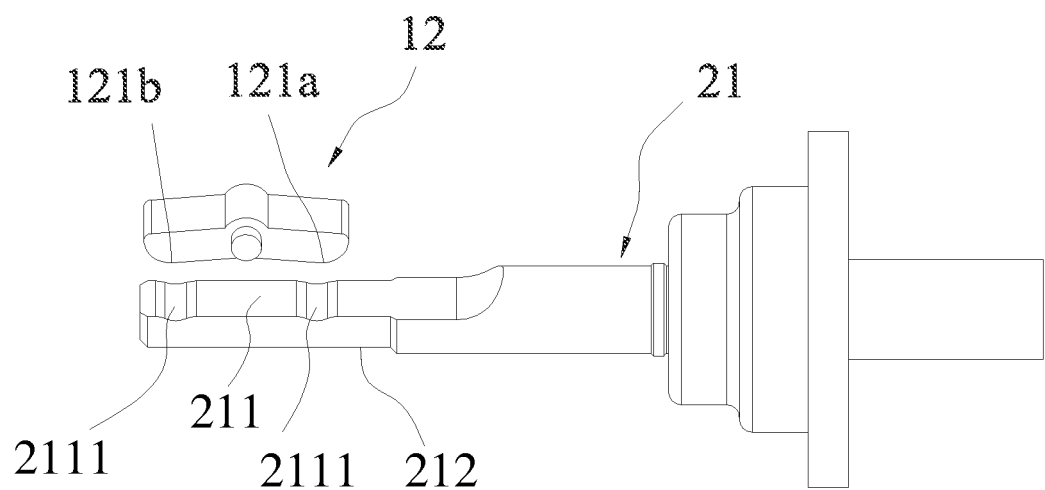
FIG. 14 is a schematic view of a preferred improvement of a drive shaft provided by an embodiment of the present disclosure.

Preferably, as shown in FIG. 14, the drive shaft 21 is provided with a lock cylinder mating face 211 matched with the locking cylinder 12; the lock cylinder mating face 211 is provided with one or two grooves 2111 (in this embodiment, there are two grooves 2111) matched with the force applying part 121 of the locking cylinder 12. The groove 2111 can make the locking effect more reliable when it is in the locking position. Meanwhile, it will make the elastic deformation of the locking cylinder 12 partially rebound, and the change of stress can make the elasticity easier to be maintained for a long time.

Figure 15:
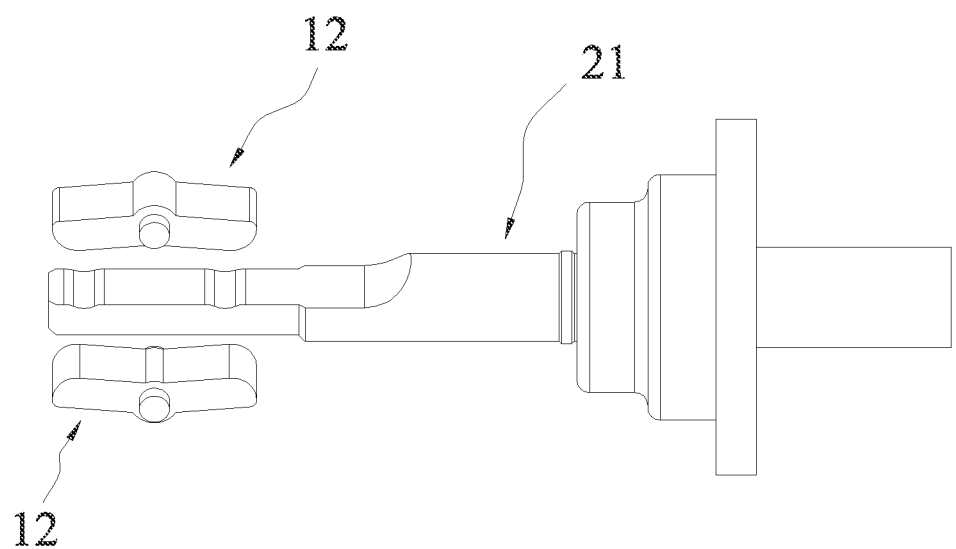
FIG. 15 is a schematic perspective view of a preferred improvement further provided by an embodiment of the present disclosure, with locking cylinders arranged above and below.

Preferably, as shown in FIG. 15, the brush head assembly 1 includes a plurality of locking cylinders 12, for example, in this embodiment, it includes an upper locking cylinder 12 and a lower locking cylinder 12; a plurality of lock cylinder assembly cavities 1124 are formed between the component main body 131 and the inner wall of the component assembly cavity 112, the number of the lock cylinder assembly cavities 1124 corresponds to that of the locking cylinder 12, and the lock cylinder assembly cavity 1124 is communicated with the shaft center hole 130; and each locking cylinder 12 is correspondingly assembled into each lock cylinder assembly cavity 1124.

Figure 16:
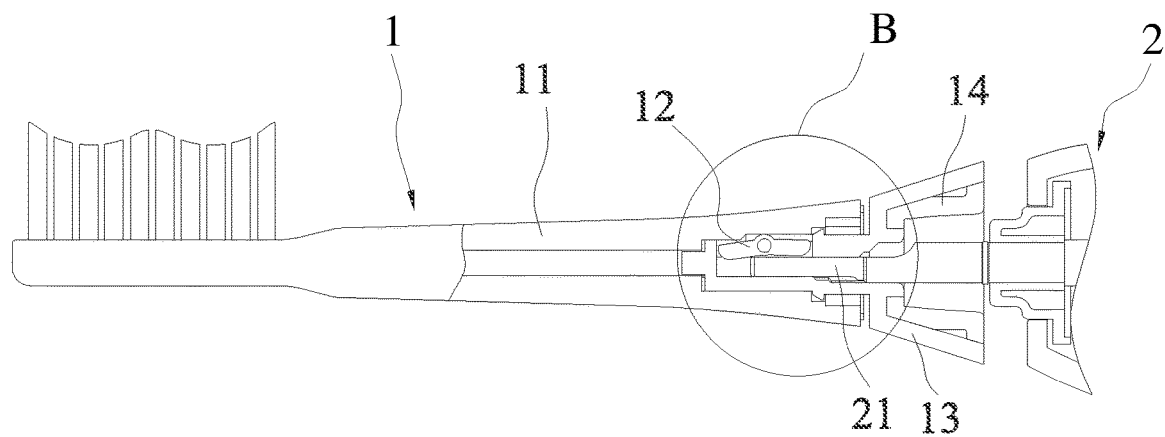
FIG. 16 is a schematic view of an unlocked state in which a drive shaft is not fully inserted into a brush head assembly provided by an embodiment of the present disclosure.
Figure 17:
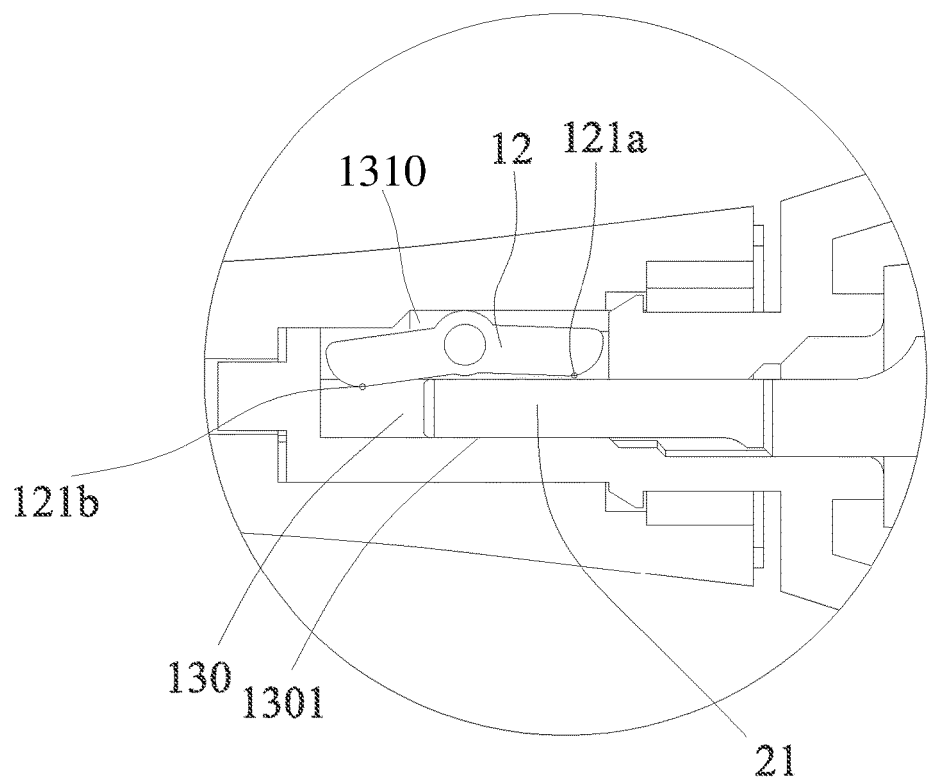
Figure 18:
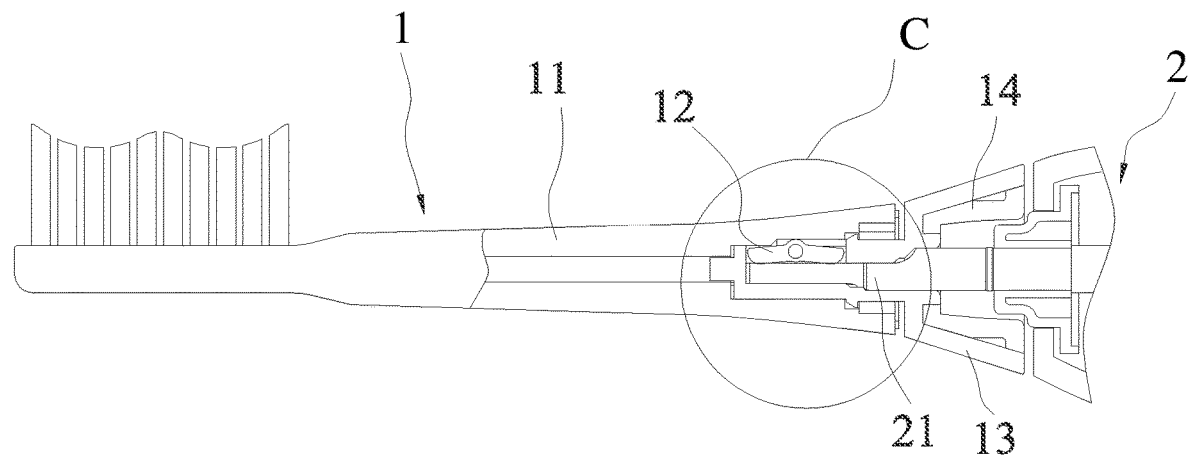
FIG. 18 is a schematic view of a locked state in which a drive shaft is fully inserted into a brush head assembly provided by an embodiment of the present disclosure.
Figure 19:
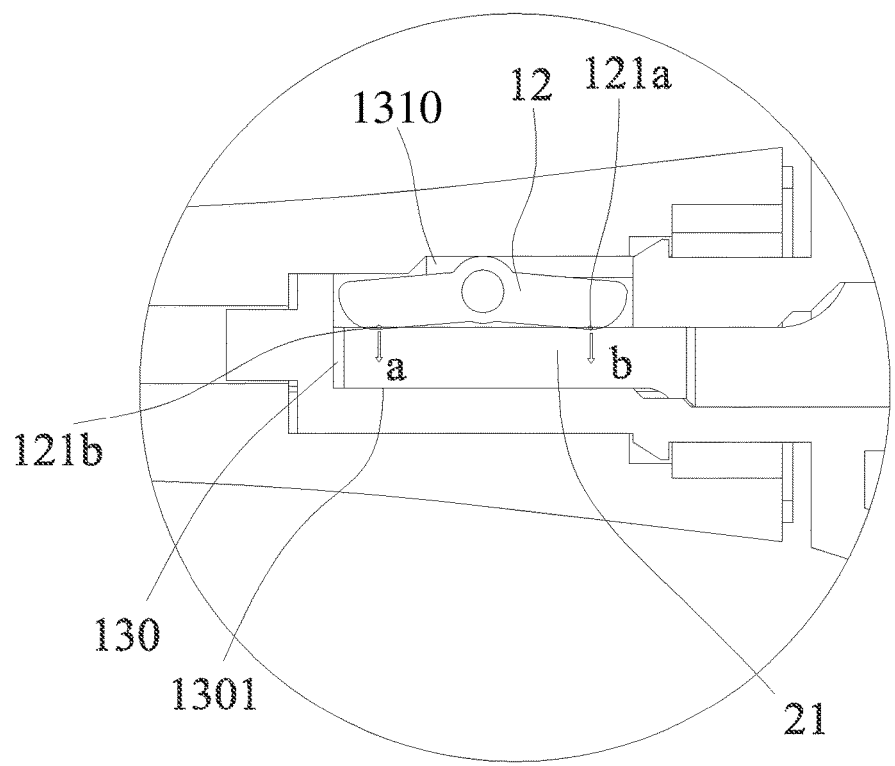
FIG. 19 is an enlarged schematic view of C shown in FIG. 18.

The assembly processes of the brush head assembly 1 and handle assembly 2 disclosed in this embodiment are as follows:

As shown in FIGS. 16 and 17, the front end (or head) of the drive shaft 21 of the handle assembly 2 is slowly inserted into the shaft center hole 130 of the brush head assembly 1. When the front end (or head) of the drive shaft 21 passes through the first force applying part 121a of the locking cylinder 12, but has not yet touched the second force applying part 121b, the drive shaft 21 would not be stressed. The insertion process is convenient and smooth. As shown in FIGS. 18 and 19, only until the front end (or head) of the drive shaft 21 contacts the second force applying part 121b, the fulcrum force-receiving part 124 abuts against the lock cylinder force-bearing part 1126, and with the leverage of the locking cylinder 12 and a small-angle rotation, will the drive shaft 21 be pressed by the two contact parts (first force applying part 121a and second force applying part 121b). When inserted in place, through the combined effects of elastic deformation of the locking cylinder 12 and the lock cylinder force-bearing part 1126 of the component assembly cavity 112, the generated force acts on the drive shaft 21 through the two contact parts (first force applying part 121a and second force applying part 121b), then the drive shaft 21 is closely pressed on the force-bearing part at drive shaft lower end 1301 on the inner wall of the shaft center hole 130 of the linking component 13, so the drive shaft 21 is locked. Only when it contacts with the distance from the second force applying part 121b to the front limit table 1311, will the drive shaft 21 start to bear force, and the force distance is short, so it is convenient for insertion and extraction, and not easy to wear.

In the brush head assembly 1 of the present disclosure, a component assembly cavity 112 is arranged at the tail end of the brush head body 11, a linking component 13 is installed in the component assembly cavity 112, and a deformable locking cylinder 12 including a fulcrum force-receiving part 124 and a force applying part 121 with elastic forces at both ends is embedded. The locking cylinder 12 enables that when that drive shaft 21 is insert into the shaft center hole 130 of the brush head assembly 1, the head of the drive shaft 21 passes through the first force applying part 121a of the two force applying parts 121 of the locking cylinder 12 without touching the second force applying part 121b, the drive shaft 21 would not be stressed. Until the drive shaft 21 contacts the second force applying part 121b, the drive shaft 21 starts to receive the elastic force exerted by the two force applying parts 121 under the lever action of the locking cylinder 12, thus making the insertion and extraction process more convenient and smooth. Only when the insertion is fully completed, will the elastic force generated by the elastic deformation of the locking cylinder 12 act on the drive shaft 21 through the two force applying parts 121, so as to lock the drive shaft 21. The locking cylinder 12 makes most of the strokes of the insertion process of the drive shaft 21 smooth and convenient, only when the two force applying parts 121 are both in contact with the drive shaft 21, will the force is generated to lock the drive shaft 21, and the locking effect obtained by the elastic force can be maintained for a long time. Thus ensuring the capabilities of torque transmission and axial retention.

The above are only preferred embodiments of the disclosure, not intended to limit the disclosure. Any modifications, equivalent substitutions and improvements made within the spirit and principle of the disclosure shall be included in the protection scope of the disclosure.

What is claimed is:

1. A brush head assembly, comprising a brush head body, a linking component and a locking cylinder;
   the front end of the brush head body is provided with bristles, and the rear end is provided with a component assembly cavity;
   the locking cylinder is a deformable elastic piece, comprising a fulcrum force-receiving part at the middle part and a force applying part at both ends for applying elastic force; a connecting line between the two force applying parts and the fulcrum force-receiving part is V-shaped;
   the linking component comprises a base and a component main body, a shaft center hole is arranged at the shaft center of the base and the component main body, and the shaft center hole is used for insertion of a drive shaft;
   the component main body is installed in the component assembly cavity, and a lock cylinder assembly cavity is formed between the component main body and an inner wall of the component assembly cavity, wherein the lock cylinder assembly cavity is communicated with the shaft center hole; and the locking cylinder is embedded in the lock cylinder assembly cavity, so that when the drive shaft is inserted into the shaft center hole, the locking cylinder is elastically deformed to generate elastic force to lock the drive shaft through the two force applying parts.

2. The brush head assembly of claim 1, wherein the component assembly cavity sequentially comprises a front limit hole, a main assembly cavity and a component locking cavity from front to rear;

a guide column is arranged at the front end of the component main body of the linking component, and a snap-fit part is arranged at the rear end, the snap-fit part is connected with the base; the guide column is inserted into the front limit hole; the component main body is assembled in the main assembly cavity; the snap-fit part is locked in the component locking cavity;

a front limit table is arranged at the connection between the front end of the component main body and the guide column, and a snap protrusion is arranged at the connection between the rear end of the component main body and the snap-fit part; the lock cylinder assembly cavity is formed between the front limit table and the snap protrusion, and in the inner wall of the component assembly cavity; and the inner wall of the component assembly cavity corresponding to the lock cylinder assembly cavity is a lock cylinder force-bearing part, the lock cylinder force-bearing part abuts against the fulcrum force-receiving part when the locking cylinder is stressed, so that the locking cylinder is elastically deformed.

3. The brush head assembly of claim 2, wherein a rear limit member is installed at the rear of the component locking cavity, and the snap protrusion is clamped into the component locking cavity in front of the rear limit member, so as to install the component main body in the component assembly cavity.

4. The brush head assembly of claim 3, wherein a limit shaft is arranged at the fulcrum force-receiving part at the middle part of the locking cylinder, the limit shaft limits the locking cylinder in the lock cylinder assembly cavity without falling into the shaft center hole.

5. The brush head assembly of claim 4, wherein the component main body is provided with a shaft seat between the front limit table and the snap protrusion;

the limit shaft is installed in the shaft seat.

6. The brush head assembly of claim 1, wherein a filler is further installed in the tail of the base.

7. The brush head assembly of claim 1, wherein the brush head assembly comprises a plurality of locking cylinders; the lock cylinder assembly cavity is formed between the component main body and the inner wall of the component assembly cavity, and the number of the lock cylinder assembly cavities corresponds to that of the locking cylinders, the lock cylinder assembly cavity is communicated with the shaft center hole; and each locking cylinder is correspondingly assembled into each lock cylinder assembly cavity.

8. The brush head assembly of claim 1, wherein the locking cylinder is formed by bending an elastic metal sheet, the force applying parts at both ends form an inward folded structure by bending both ends of the elastic metal sheet; the two sides of the fulcrum force-receiving part at the middle part form an annular limit ring;

the limit ring enables the locking cylinder to be embedded in the lock cylinder assembly cavity.

9. An electric toothbrush, comprising a brush head assembly and a handle assembly, wherein the handle assembly comprises a housing, and a motor, a control panel and a battery arranged in the housing; a drive shaft of the motor extends out of the housing; characterized in that the brush head assembly is the brush head assembly of claim 1, and the brush head assembly can be inserted at the drive shaft.

10. The electric toothbrush of claim 9, wherein the drive shaft is provided with a lock cylinder mating face matched with the locking cylinder; the lock cylinder mating face is provided with one or two grooves matched with the force applying part of the locking cylinder.

11. An electric toothbrush, comprising a brush head assembly and a handle assembly, wherein the handle assembly comprises a housing, and a motor, a control panel and a battery arranged in the housing; a drive shaft of the motor extends out of the housing; characterized in that the brush head assembly is the brush head assembly of claim 2, and the brush head assembly can be inserted at the drive shaft.

12. An electric toothbrush, comprising a brush head assembly and a handle assembly, wherein the handle assembly comprises a housing, and a motor, a control panel and a battery arranged in the housing; a drive shaft of the motor extends out of the housing; characterized in that the brush head assembly is the brush head assembly of claim 3, and the brush head assembly can be inserted at the drive shaft.

13. An electric toothbrush, comprising a brush head assembly and a handle assembly, wherein the handle assembly comprises a housing, and a motor, a control panel and a battery arranged in the housing; a drive shaft of the motor extends out of the housing; characterized in that the brush head assembly is the brush head assembly of claim 4, and the brush head assembly can be inserted at the drive shaft.

14. An electric toothbrush, comprising a brush head assembly and a handle assembly, wherein the handle assembly comprises a housing, and a motor, a control panel and a battery arranged in the housing; a drive shaft of the motor extends out of the housing; characterized in that the brush head assembly is the brush head assembly of claim 5, and the brush head assembly can be inserted at the drive shaft.

15. An electric toothbrush, comprising a brush head assembly and a handle assembly, wherein the handle assembly comprises a housing, and a motor, a control panel and a battery arranged in the housing; a drive shaft of the motor extends out of the housing; characterized in that the brush head assembly is the brush head assembly of claim 6, and the brush head assembly can be inserted at the drive shaft.

16. An electric toothbrush, comprising a brush head assembly and a handle assembly, wherein the handle assembly comprises a housing, and a motor, a control panel and a battery arranged in the housing; a drive shaft of the motor extends out of the housing; characterized in that the brush head assembly is the brush head assembly of claim 7, and the brush head assembly can be inserted at the drive shaft.

17. An electric toothbrush, comprising a brush head assembly and a handle assembly, wherein the handle assembly comprises a housing, and a motor, a control panel and a battery arranged in the housing; a drive shaft of the motor extends out of the housing; characterized in that the brush head assembly is the brush head assembly of claim 8, and the brush head assembly can be inserted at the drive shaft.

* * * * *